US008286623B2

(12) United States Patent
Nishino et al.

(10) Patent No.: US 8,286,623 B2
(45) Date of Patent: Oct. 16, 2012

(54) BAND SAW CUTTING APPARATUS AND INGOT CUTTING METHOD

(75) Inventors: Hidehiko Nishino, Nishishirakawa (JP);
Yoshihiro Hirano, Nishishirakawa (JP);
Junichi Uchida, Nishishirakawa (JP)

(73) Assignee: Shin-Etsu Handotai Co., Ltd., Tokyo (JP)

( * ) Notice: Subject to any disclaimer, the term of this patent is extended or adjusted under 35 U.S.C. 154(b) by 0 days.

(21) Appl. No.: 13/056,780

(22) PCT Filed: Aug. 12, 2009

(86) PCT No.: PCT/JP2009/003876
§ 371 (c)(1),
(2), (4) Date: Jan. 31, 2011

(87) PCT Pub. No.: WO2010/032371
PCT Pub. Date: Mar. 25, 2010

(65) Prior Publication Data
US 2011/0126814 A1    Jun. 2, 2011

(30) Foreign Application Priority Data
Sep. 19, 2008   (JP) .................................. 2008-241587

(51) Int. Cl.
*B28D 1/06*   (2006.01)
*B28D 1/08*   (2006.01)
*B28D 1/12*   (2006.01)

(52) U.S. Cl. ...... 125/12; 125/15; 125/16.01; 125/16.02; 125/21; 451/41

(58) Field of Classification Search ............... 83/169; 125/12, 15, 16.01, 16.02, 21; 451/8, 9, 10, 451/11, 41
See application file for complete search history.

(56) References Cited

U.S. PATENT DOCUMENTS

| | | | |
|---|---|---|---|
| 4,287,869 A | * | 9/1981 | Schmid ........................ 125/16.01 |
| 5,201,305 A | * | 4/1993 | Takeuchi ........................... 125/21 |
| 5,778,869 A | * | 7/1998 | Toyama ........................ 125/16.02 |

(Continued)

FOREIGN PATENT DOCUMENTS
JP   A-1-159169   6/1989
(Continued)

OTHER PUBLICATIONS

International Search Report dated Sep. 8, 2009 in International Patent Application No. PCT/JP2009/003876.
Apr. 24, 2012 Office Action issued in Japanese Patent Application No. 2008-241587 (with partial English-language translation).

*Primary Examiner* — Timothy V Eley
(74) *Attorney, Agent, or Firm* — Oliff & Berridge, PLC

(57) ABSTRACT

The present invention is a band saw cutting apparatus including: a cutting table on which an ingot is horizontally placed; an endless-belt blade provided in a tensioned state between pulleys, the blade having a blade-abrasive-grain portion and a blade base; and a coolant spraying opening for spraying a coolant on the blade, the band saw cutting apparatus cutting the ingot by relatively feeding the blade from above to below, the blade being driven to rotate by rotating the pulleys, wherein the pulleys is configured to be rotatable about an axis thereof in both directions, and a direction of driving to rotate the blade can be changed to cut the ingot. As a result, there is provided a band saw cutting apparatus and an ingot cutting method that can stably secure the quality of the ingot to be cut, increase the lifetime of the blade, and improve the productivity.

8 Claims, 3 Drawing Sheets

U.S. PATENT DOCUMENTS

| | | | |
|---|---|---|---|
| 6,178,961 B1 * | 1/2001 | Nagatsuka et al. | 125/21 |
| 6,178,962 B1 * | 1/2001 | Ohashi et al. | 125/16.01 |
| 6,390,896 B1 * | 5/2002 | Huber et al. | 451/59 |
| 6,652,356 B1 * | 11/2003 | Ariga | 451/7 |
| 6,886,550 B2 * | 5/2005 | Hauser | 125/21 |
| 7,089,925 B1 * | 8/2006 | Lin et al. | 125/21 |
| 2006/0174862 A1 | 8/2006 | Yamasaki et al. | |
| 2010/0006082 A1 * | 1/2010 | Glinski et al. | 125/16.02 |

FOREIGN PATENT DOCUMENTS

| | | |
|---|---|---|
| JP | A-8-243837 | 9/1996 |
| JP | A-2005-28620 | 2/2005 |
| JP | A-2006-218652 | 8/2006 |
| JP | A-2008-161992 | 7/2008 |

* cited by examiner (A)

(B)

(A)

(B)

BAND SAW CUTTING APPARATUS AND
INGOT CUTTING METHOD

TECHNICAL FIELD

The present invention relates to an ingot cutting apparatus for cutting an ingot, particularly a silicon ingot, pulled by the Czochralski method (the CZ method) and the like and a cutting method by using the same.

BACKGROUND ART

A silicon ingot produced by the CZ method and the like has a cylindrical body portion and cone-shaped end portions (a top portion and a tail portion). In processing of the silicon ingot, these cone-shaped end portions are cut away to separate the cylindrical body portion, and the body portion is cut into a plurality of blocks as needed. The blocks are thereafter subjected to processing for obtaining a wafer.

An inner diameter slicer and an outer diameter slicer or the like have been frequently used for the case of the cutting processing of the cone-shaped end portions and the cutting processing of the body portion into a plurality of blocks. As the diameter of the wafer becomes larger in recent years, a band saw also has become to be frequently used.

Here, FIG. 6 shows an outline of a method for cutting into a block by using a conventional band saw cutting apparatus.

As shown in FIG. 6, a cutting table 105 for supporting the ingot 104 during cutting is arranged in the band saw cutting apparatus 101. The ingot 104 is horizontally placed on the cutting table 105 before cutting.

Moreover, in the band saw cutting apparatus 101, an endless-belt blade 102 is provided in a tensioned state between pulleys 103 and 103', the blade which has a blade-abrasive-grain portion having abrasive grains of diamond adhered to an end portion of a thin blade base.

A position where the ingot 104 is placed is adjusted so that a cutting position of the ingot 104 corresponds to that of the blade 102.

The blade 102 is driven to rotate by rotating the pulleys 103 and 103', and the ingot 104 is cut by relatively feeding the blade 102 from above to below.

In recent years, the blade that is made thinner has been used in the above-described band saw cutting apparatus in order to improve a product yield by reducing stock removal of the ingot during cutting.

As the cutting is repeated as described above, the abrasive grains are buried due to accumulating a cut powder on the blade-abrasive-grain portion, and the abrasive grains are worn by the cutting so that the cutting capacity of the blade is deteriorated. When the cutting is performed in such a state, there arises a problem that the blade 102 is displaced by an increase of cutting resistance to generate deflection of an edge of the blade 102 and that variation of cutting precision is generated, such as sori of the cut wafer.

Against this problem, there is disclosed a cutting method that is stated to enable a wafer having a uniform thickness to be stably obtained by detecting an increase and decrease of the cutting resistance during cutting from an increase and decrease of an electric power consumption of a first motor and by controlling an increase and decrease of a cutting rate of a second motor, which moves a blade in a cutting direction on the basis of the increase and decrease of the electric power consumption (See Patent Literature 1).

CITATION LIST

Patent Literature 1: Japanese Unexamined Patent publication (Kokai) No. 2005-28620

SUMMARY OF INVENTION

To avoid the problems of the edge deflection of the blade and the deterioration of the cutting capacity of the abrasive grains due to the increase of the cutting resistance as described above, the blade is periodically subjected to dressing or tooling. Conventionally, these are carried out by pressing a dressing member to the blade while an operator adjusts a pressing force and angle on the basis of the operator's experiences.

However, the operation greatly depends on an individual skill of the operator, and particularly with regard to the blade that is made thinner, it is thereby difficult to repair the edge deflection of the blade. Therefore, there arises a problem that the ingot cannot be cut with stable quality and that the lifetime of the blade decreases.

Moreover, there is also a problem that process time increases by performing the dressing or tooling by the operator as described above so that productivity decreases.

The present invention was accomplished in view of the above-explained problems, and its object is to provide a band saw cutting apparatus and an ingot cutting method that can stably secure the quality of the ingot to be cut, increase the lifetime of the blade, and improve the productivity.

To achieve this object, the present invention provides an ingot cutting method including: horizontally placing an ingot on a cutting table; providing an endless-belt blade in a tensioned state between pulleys, the blade having a blade-abrasive-grain portion and a blade base; driving to rotate the blade by rotating the pulleys; and cutting the ingot by relatively feeding the blade from above to below while spraying a coolant on the blade, wherein the ingot is cut with the blade driven to rotate in one direction, and after the cutting and before next cutting, a direction of driving to rotate the blade is changed into a direction opposite to the one direction to cut the ingot.

In this manner, when the ingot is cut with the blade driven to rotate in one direction, and when after the cutting and before next cutting, the direction of driving to rotate the blade is changed into a direction opposite to the one direction to cut the ingot, a displacement amount of the edge deflection of the blade can be suppressed to a low level by changing a direction of the edge deflection of the blade between before and after the change of the direction of driving to rotate the blade. The cutting precision of the ingot can be thereby stably secured, and the lifetime of the blade can be improved. In addition to these, frequency of the dressing can be reduced, and the productivity can be improved.

In this case, it is preferable that a displacement amount of the blade is measured during the cutting of the ingot, and timing of changing the direction of driving to rotate the blade is determined on the basis of the measured displacement amount.

In this manner, when the displacement amount of the blade is measured during the cutting of the ingot and the timing of changing the direction of driving to rotate the blade is determined on the basis of the measured displacement amount, cutting failure caused by an increase of the displacement amount of the blade can be suppressed, and the quality of the ingot can be more surely stably secured. In addition to this, the displacement amount of the edge deflection of the blade can be more effectively suppressed to a low level, the lifetime of the blade can be more surely improved, and the productivity can be more surely improved.

In this case, the blade having a thickness of the base of 0.1 to 0.5 mm is preferably used.

In this manner, when the blade having a thickness of the base of 0.1 to 0.5 mm is used, the displacement amount of the edge deflection of the blade can be more effectively suppressed to a low level by changing the direction of the edge deflection of the blade between before and after the change of the direction of driving to rotate the blade according to the present invention, while the product yield is improved by using the blade that is made thinner.

Furthermore, the present invention provides a band saw cutting apparatus including: a cutting table on which an ingot is horizontally placed; an endless-belt blade provided in a tensioned state between pulleys, the blade having a blade-abrasive-grain portion and a blade base; and a coolant spraying opening for spraying a coolant on the blade, the band saw cutting apparatus cutting the ingot by relatively feeding the blade from above to below, the blade being driven to rotate by rotating the pulleys, wherein the pulleys is configured to be rotatable about an axis thereof in both directions, and a direction of driving to rotate the blade can be changed to cut the ingot.

In this manner, when the pulleys is configured to be rotatable about an axis thereof in both directions, and the direction of driving to rotate the blade can be changed to cut the ingot, the band saw cutting apparatus can suppress the displacement amount of the edge deflection of the blade to a low level by changing the direction of the edge deflection of the blade between before and after the change of the direction of driving to rotate the blade. The band saw cutting apparatus can thereby stably secure the cutting precision of the ingot and can improve the lifetime of the blade. In addition to these, the band saw cutting apparatus can reduce the frequency of the dressing and can improve the productivity.

In this case, it is preferable that the band saw cutting apparatus further includes a displacement sensor for measuring a displacement amount of the blade, and that the direction of driving to rotate the blade is changed on the basis of the displacement amount of the blade, the displacement amount being measured by the displacement sensor during cutting of the ingot.

In this case, when the band saw cutting apparatus further includes the displacement sensor for measuring a displacement amount of the blade, and the direction of driving to rotate the blade is changed on the basis of the displacement amount of the blade, the displacement amount being measured by the displacement sensor during cutting of the ingot, the band saw cutting apparatus can suppress the cutting failure caused by an increase of the displacement amount of the blade and can more surely stably secured the quality of the ingot. In addition to these, the band saw cutting apparatus can more effectively suppress the displacement amount of the edge deflection of the blade to a low level, can more surely improve the lifetime of the blade, and can more surely improve the productivity.

In this case, the blade preferably has a thickness of the base of 0.1 to 0.5 mm.

In this manner, when the blade has a thickness of the base of 0.1 to 0.5 mm, the band saw cutting apparatus can more surely suppress the displacement amount of the edge deflection of the blade to a low level by changing the direction of the edge deflection of the blade between before and after the change of the direction of driving to rotate the blade according to the present invention, while the product yield is improved by using the blade that is made thinner.

In the band saw cutting apparatus according to the present invention, the pulleys between which the blade is provided in a tensioned state is configured to be rotatable about an axis thereof in both directions, the ingot is cut with the blade driven to rotate in one direction, and after the cutting and before next cutting, the direction of driving to rotate the blade is changed into a direction opposite to the one direction to cut the ingot. The displacement amount of the edge deflection of the blade can be therefore suppressed to a low level by changing the direction of the edge deflection of the blade between before and after the change of the direction of driving to rotate the blade. The cutting precision of the ingot can be thereby stably secured, and the lifetime of the blade can be improved. In addition to these, the frequency of the dressing can be reduced, and the productivity can be improved.

DESCRIPTION OF EMBODIMENTS

Figure 1:
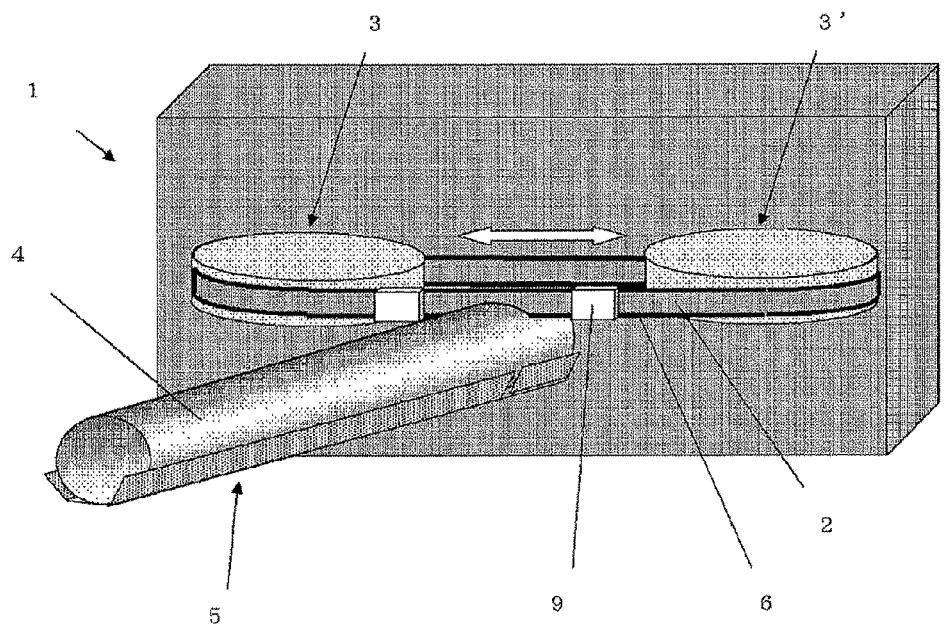
FIG. 1 are schematic views showing an example of the band saw cutting apparatus according to the present invention, in which (A) shows a schematic view thereof, and (B) shows a schematic top view thereof.
Figure 1:
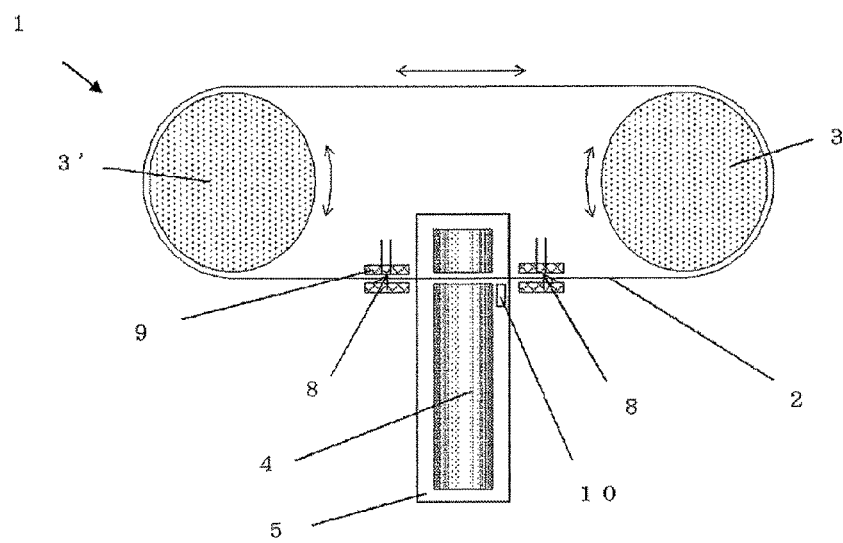

Hereinafter, an embodiment of the present invention will be explained, but the present invention is not restricted thereto.

As the cutting of the ingot with a conventional band saw cutting apparatus is repeated, the abrasive grains are buried due to a cut powder accumulated on the blade-abrasive-grain portion and the abrasive grains are worn, so that the cutting capacity thereof is deteriorated. Against this, the blade is periodically subjected to dressing or tooling. Conventionally, these are carried out by pressing a dressing member to the blade while an operator adjusts a pressing force and angle on the basis of the operator's experiences.

However, the operation greatly depends on an individual skill of the operator, and particularly with regard to the blade that is made thinner, it is thereby difficult to repair the edge deflection of the blade. Therefore, there arises a problem that the cutting cannot be performed with stable quality and that the lifetime of the blade decreases. Moreover, there is also a problem that process time increases by performing the dressing or tooling by the operator as described above so that the productivity decreases.

In view of this, the present inventor repeatedly keenly conducted studies to solve the above-described problems. As a result, the present inventor acquired knowledge as follows. When cutting is performed with the blade driven to rotate in one direction, the edge deflection of the blade becomes small in a condition where dressing directions of the abrasive grains correspond to each other in a balanced manner, and the cutting can be precisely performed. However, for example, when some abrasive grains fall off due to self-purification of the abrasive grains, the balance of the dressing directions of the abrasive grains is lost, and in this case, the edge deflection of the blade becomes large. It is difficult to repair the balance of the dressing directions of the abrasive grains by a conventional dressing and tooling in some cases.

The present inventor repeatedly keenly conducted studies further, and conceived that, in the cutting of the ingot, the balance of the dressing directions of the abrasive grains can be repaired by reversing the direction of driving to rotate the blade so as to change the direction in which the blade-abrasive-grain portion of the blade comes into contact with the ingot, whereas the blade was conventionally driven to rotate only in one direction. Moreover, the present inventor found that the direction of the deflection that occurs at the edge of the blade is reversed between before and after the reversal of the direction of driving to rotate the blade so that the edge deflection of the blade can be modified and the displacement amount of the edge deflection of the blade can be suppressed to a low level, and bringing the present invention to completion.

FIG. 1(A) is a schematic view showing an example of the band saw cutting apparatus according to the present invention. FIG. 1(B) is a schematic top view thereof.

As shown in FIGS. 1(A) and (B), the band saw cutting apparatus 1 according to the present invention includes the cutting table 5 for placing the ingot 4 at the time of cutting, the blade 2 for cutting the ingot 4, the pulleys 3 and 3' for providing the blade 2 in a tensioned state and driving to rotate the blade, and the like.

Figure 2:
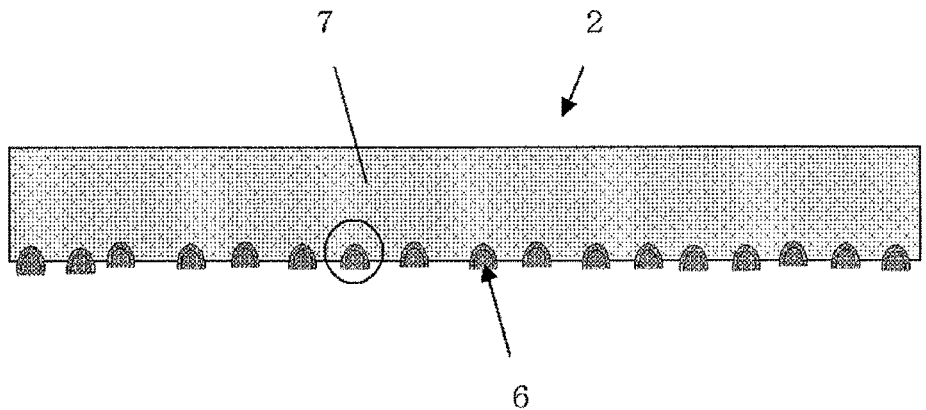
FIG. 2 is a schematic view showing the blade that can be used in the band saw cutting apparatus according to the present invention.

The blade 2 is formed in an endless-belt shape, and has the blade-abrasive-grain portion 6 having abrasive grains of diamond adhered to an end portion of a thin blade base 7, as shown in FIG. 2.

Here, a grain size of the blade-abrasive-grain portion 6 is not restricted in particular. For example, the grain size can be a size of 120 to 220. The shape of the abrasive grain can be semicircular or rectangular. When the abrasive grain has such a symmetrical shape, the change of the direction of driving to rotate the blade 2 does not affect a cutting surface of the ingot 4.

The pulleys 3 and 3' are configured to be rotatable about an axis thereof in both directions. The blade 2 is provided in a tensioned state between pulleys 3 and 3'. The blade 2 can be driven to rotate by rotating the pulleys 3 and 3'. As described above, since the pulleys 3 and 3' is rotatable about an axis thereof in both directions, the band saw cutting apparatus can change the direction of driving to rotate the blade 2. Moreover, a fixing bolt is desirably provided at the pulleys 3 and 3' so as not to loosen when the rotation direction thereof is changed.

Here, the pulleys may be configured to be one shaft drive in which any one of the two pulleys 3 and 3' can be driven to rotate by itself or two shaft drive in which both pulleys can be driven to rotate by itself.

Moreover, the tension for stretching the blade 2 between the pulleys 3 and 3' may be 1 ton or more, but this is not restricted in particular. In this manner, when the tension for stretching the blade 2 between the pulleys 3 and 3' is 1 ton or more, even in case of the one shaft drive, the shake of the blade 2 can be prevented from occurring during the rotation regardless of the direction of driving to rotate the blade 2.

As shown in FIG. 1(B), a pair of static pressure pads 9 can be arranged at predetermined intervals with facing to one another so as to allow passage of the blade 2 to suppress the variation of the blade 2 during cutting.

The band saw cutting apparatus also includes the coolant spraying opening 8 for spraying a coolant, which is supplied to remove clogging and processing heat of the blade-abrasive-grain portion 6, on the blade 2.

As shown in FIG. 1(B), the coolant spraying openings 8 may be arranged respectively at the front and rear of a movement direction of the blade 2 with the ingot 4 put between the openings. It can be suppressed to splash the coolant by spraying the coolant from the coolant spraying opening 8 arranged at the front of the movement direction of the blade 2, with respect to the ingot.

Here, the coolant spraying opening 8 may be arranged at a nozzle, and the structure of arranging the coolant spraying opening 8 on a surface of a blade 2 side of the static pressure pad 9 may be adopted, as shown in FIG. 1(B). In the case of this structure of arranging the coolant spraying opening 8 on the surface of the blade 2 side of the static pressure pad 9, the clogging and processing heat of the blade-abrasive-grain portion 6 can be removed and vibration of the blade 2 can be suppressed by spraying the coolant from the coolant spraying opening 8 to the blade 2 during cutting of the ingot 4.

The band saw cutting apparatus 1 according to the present invention configured as described above makes the blade-abrasive-grain portion 6 abut on the ingot 4 to cut the ingot 4 by relatively feeding the blade 2, which is driven to rotate by rotating the pulleys 3 and 3', from above to below. After the cutting and before next cutting, the direction of driving to rotate the blade 2 is changed by reversing the rotation direction of the pulleys 3 and 3', and the ingot 4 can be cut by the same way as above.

Figure 3:
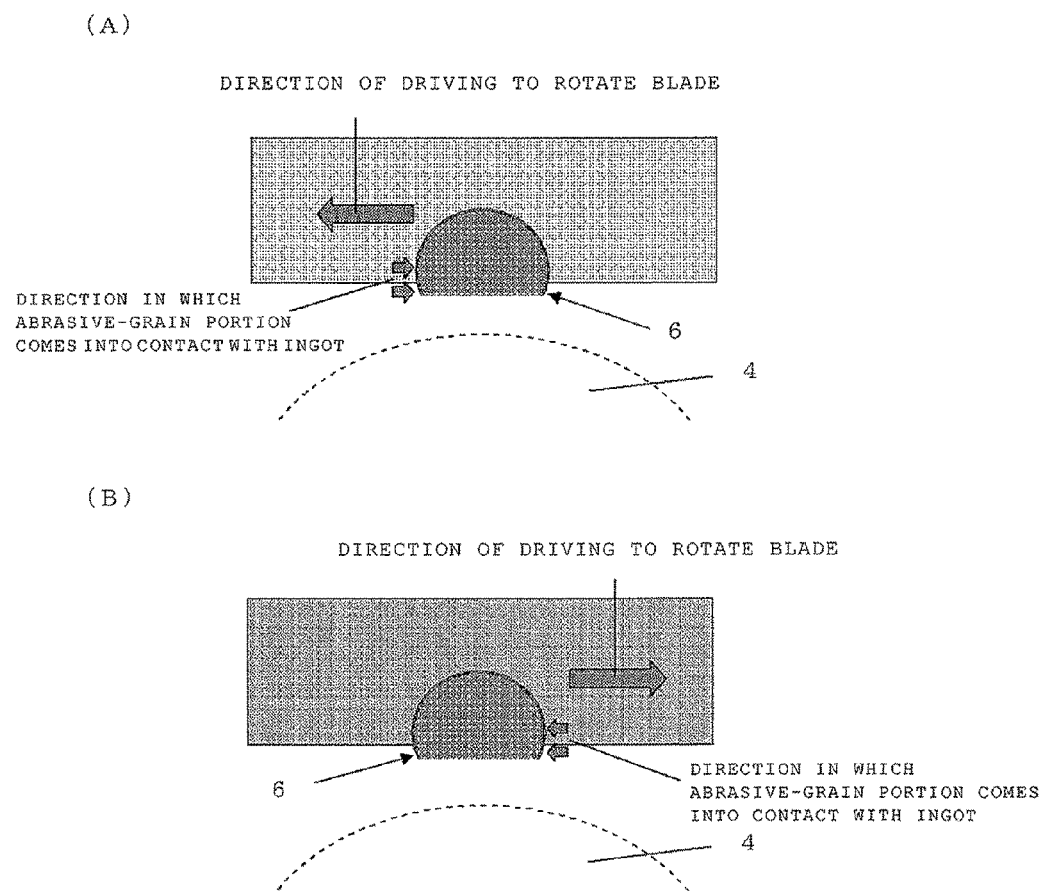
FIG. 3 are schematic explanatory views showing the direction in which the blade-abrasive-grain portion comes into contact with the ingot, with respect to the direction of driving to rotate the blade during cutting of the ingot, in which (A) shows a case of driving to rotate the blade leftward, and (B) shows a case of driving to rotate the blade rightward.

FIGS. 3(A) and (B) are enlarged views of the vicinity of the abrasive grain surrounded by a circle illustrated in FIG. 2, and are schematic explanatory views showing the direction in which the blade-abrasive-grain portion 6 comes into contact with the ingot 4, with respect to the direction of driving to rotate the blade 2 during cutting of the ingot 4. As shown in FIGS. 3(A) and (B), the direction in which the blade-abrasive-grain portion 6 comes into contact with the ingot 4 is changed, with respect to the direction of driving to rotate the blade 2.

As shown in FIG. 3(A), the ingot 4 is cut with the blade 2 driven to rotate in one direction. As the cutting proceeds or cutting into a block is repeatedly performed, the cutting resistance increases due to the wear of the blade-abrasive-grain portion 6 and the accumulated cut powder so that the edge deflection of the blade 2 occurs in either of the directions.

The band saw cutting apparatus according to the present invention changes the direction of driving to rotate the blade 2, for example, from a direction shown in FIG. 3(A) to a direction shown in FIG. 3(B) to cut the ingot 4. The direction in which the blade-abrasive-grain portion 6 comes into contact with the ingot 4 is thereby changed so that the direction of the edge deflection of the blade 2 at the time of cutting in FIG. 3(B) becomes opposite to that at the time of cutting in FIG. 3(A). That is, increasing the displacement amount of the edge deflection of the blade 2 can be suppressed, and the displacement amount of the edge deflection of the blade 2 can be consequently suppressed to a low level and stabilized.

As a result, the cutting precision of the ingot 4 can be stably secured, and the lifetime of the blade 2 can be improved. In addition, blunt abrasive grains due to the wear of the blade-abrasive-grain portion 6 and the like fall off by self-purification so that the cutting capacity recovers, and the edge deflection of the blade 2 can be suppressed according to the present invention as described above. The frequency of the dressing can be therefore reduced, and the productivity can be improved.

In this case, as shown in FIG. 1(B), the displacement sensor 10 for measuring the displacement amount of the blade 2 can be provided. The displacement amount of the blade 2 is measured by the displacement sensor 10 during cutting of the ingot 4, and the direction of driving to rotate the blade 2 can be changed on the basis of the measured displacement amount.

For example, when the measured displacement amount of the blade 2 becomes a predetermined value or more, the direction of driving to rotate the blade 2 may be changed after the cutting and before next cutting.

Moreover, the band saw cutting apparatus can be provided with a control unit into which these control is programmed in advance and a servomotor at a shaft of the pulley to automatize.

By this means, the cutting failure caused by the increase of the displacement amount of the blade 2 can be suppressed, and the quality of the ingot 4 can be more surely stably secured. In addition to these, the displacement amount of the edge deflection of the blade 2 can be more effectively suppressed to a low level, and the lifetime of the blade 2 and the productivity can be more surely improved.

Here, the predetermined value of the displacement amount of the blade 2 when the direction of driving to rotate the blade 2 is changed may be, for example, 100 μm.

In this case, the blade 2 preferably has a thickness of the base of 0.1 to 0.5 mm.

As described above, when the blade has a thickness of the base of 0.1 to 0.5 mm, the band saw cutting apparatus can improve the product yield by using the blade 2 that is made thinner and, with regard to the edge deflection that is easy to occur due to making it thinner, the displacement amount of the edge deflection of the blade 2 can be suppressed to a low level by changing the direction of the edge deflection of the blade 2 between before and after the change of the direction of driving to rotate the blade 2 according to the present invention. The present invention thus can be more preferably used for the blade having a thin edge thickness.

Next, the ingot cutting method according to the present invention will be explained.

Hereinafter, the case of using the band saw cutting apparatus according to the present invention as shown in FIGS. 1(A) and (B) will be explained.

First, the ingot 4 to be cut is horizontally placed on the cutting table 5. A position where the ingot 4 is placed is adjusted so that a cutting position of the ingot 4 corresponds to that of the blade 2.

The blade 2 is thereafter driven to rotate in one direction by rotating the pulleys 3 and 3', and the ingot 4 is cut by relatively feeding the blade 2 from above to below. In this case, the blade 2 may be fed from above to below, or alternatively the ingot 4 may be fed from below to above.

The direction of driving to rotate the blade is reversed at a given point in time to cut the ingot.

As described above, when the ingot 4 is cut with the blade 2 driven to rotate in one direction and thereafter the direction of driving to rotate the blade 2 is changed into a direction opposite to the one direction to cut the ingot 4, the displacement amount of the edge deflection of the blade 2 can be suppressed to a low level by changing the direction of the edge deflection of the blade 2 between before and after the change of the direction of driving to rotate the blade 2. The cutting precision of the ingot 4 can be thereby stably secured, and the lifetime of the blade 2 can be improved. In addition to these, the frequency of the dressing can be reduced, and the productivity can be improved.

In this case, it is preferable that the displacement amount of the blade 2 is measured during the cutting of the ingot 4, and the timing of changing the direction of driving to rotate the blade 2 is determined on the basis of the measured displacement amount.

For example, when the measured displacement amount of the blade 2 becomes a predetermined value or more, the direction of driving to rotate the blade 2 may be changed after the cutting and before next cutting.

Moreover, the process can be automatized by programming these control in advance.

As described above, when the displacement amount of the blade 2 is measured during the cutting of the ingot 4, and the timing of changing the direction of driving to rotate the blade 2 is determined on the basis of the measured displacement amount, the cutting failure caused by the increase of the displacement amount of the blade 2 can be suppressed, and the quality of the ingot 4 can be more surely stably secured. In addition to these, the displacement amount of the edge deflection of the blade 2 can be more effectively suppressed to a low level, the lifetime of the blade 2 and the productivity can be more surely improved.

Here, the predetermined value of the displacement amount of the blade 2 when the direction of driving to rotate the blade 2 is changed may be, for example, 100 μm. It is to be noted that the timing of changing the direction of driving to rotate the blade 2 is not restricted to the above-described case of determining it on the basis of the displacement amount of the blade 2. It may be changed by using a number of cutting, operation time, cutting resistance, and other factors.

In this case, the blade 2 having a thickness of the base of 0.1 to 0.5 mm is preferably used.

As described above, when the blade 2 having a thickness of the base of 0.1 to 0.5 mm is used, the product yield can be improved by using the blade 2 that is made thinner, and the displacement amount of the edge deflection of the blade 2 can be more surely suppressed to a low level by changing the direction of the edge deflection of the blade 2 between before and after the change of the direction of driving to rotate the blade 2 according to the present invention, although the edge deflection is easy to occur due to making it thinner.

Hereinafter, the present invention will be explained in more detail based on Example and Comparative Example, but the present invention is not restricted thereto.

EXAMPLE

With the band saw cutting apparatus according to the present invention as shown in FIG. 1, the ingot was repeatedly cut into a block by the ingot cutting method according to the present invention. The displacement amount of the blade was measured with an eddy current sensor. After the cutting in which the measured displacement amount became 100 μm or more and before next cutting, the direction of driving to rotate the blade was changed to repeatedly cut. The number of cutting when the displacement amount of the blade became 100 μm or more next was evaluated. These were repeatedly carried out to evaluate the number of cutting when the displacement amount of the blade became 200 μm as the lifetime of the blade.

Here, the thickness of the base of the used blade was 0.3 mm, and the one shaft drive in which one pulley is driven to rotate by itself was configured. The tension for stretching the blade between the pulleys was 1.4 ton.

As a result, it was revealed that an average number of cutting when the displacement amount of the blade became 100 μm or more was approximately 100 times, and that it was improved in comparison with an average number of 20 times in the later-explained Comparative example.

Accordingly, it is confirmed that the band saw cutting apparatus and the ingot cutting method according to the present invention can suppress the displacement amount of the edge deflection of the blade to a low level, can reduce the frequency of the dressing, and can improve the productivity.

The displacement amount of the blade was 10 μm and the direction of the displacement thereof was a minus direction, when the direction of driving to rotate the blade was changed and the ingot was cut, after the displacement amount of the blade became 100 μm or more.

Figure 4:
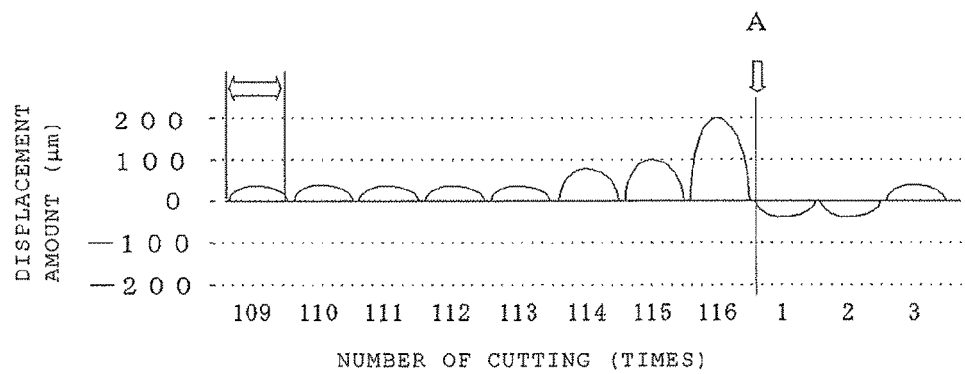
FIG. 4 is a view showing the result of the displacement amount of the blade in Example.

FIG. 4 shows the change of the displacement amount of the blade at this point. As shown in FIG. 4, it was revealed that since the displacement amount when the number of cutting was 116 times became 100 μm or more, the direction of driving to rotate the blade was changed (A point in FIG. 4), and that, in a subsequent cutting, the blade was displaced in a minus direction, that is, in a direction opposite to that before. In addition, the displacement amount thereof was suppressed to a low level of 10 μm.

Figure 5:
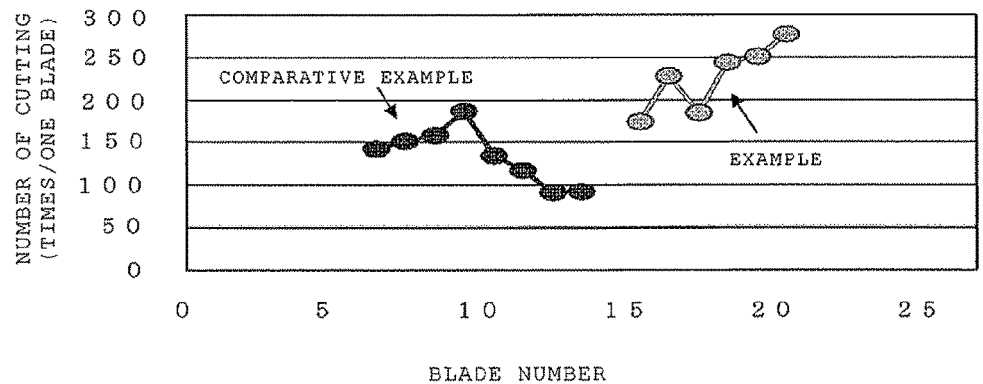
FIG. 5 is a view of showing the results of the lifetime of the blade in Example and Comparative Example.

FIG. 5 shows the result of the lifetime of the blade. As shown in FIG. 5, it was revealed that the number of cutting increased in comparison with the later-explained Comparative Example, and that an average number of cutting was 1.4 times as large as an average of Comparative Example. It is accordingly confirmed that the band saw cutting apparatus and the ingot cutting method according to the present invention can improve the lifetime of the blade.

COMPARATIVE EXAMPLE

Figure 6:
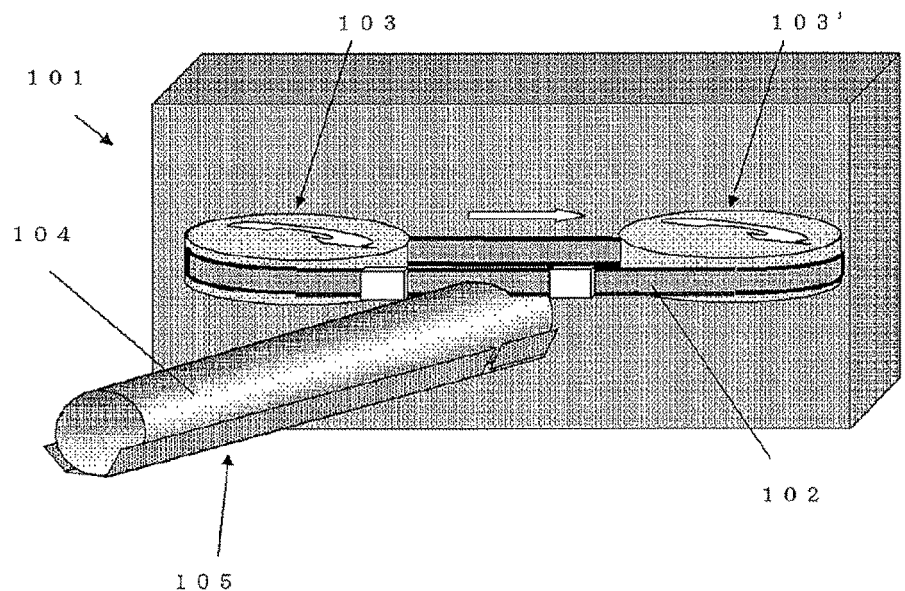
FIG. 6 is a schematic view showing an example of a conventional band saw cutting apparatus.

A conventional band saw cutting apparatus in which a blade is driven to rotate in only one direction as shown in FIG. 6 was used to cut an ingot in the same conditions as Example except that the dressing and tooling of the blade were performed by an operator when the displacement amount of the blade became 100 μm or more, and the same evaluation as Example was carried out.

As a result, it was revealed that an average number of cutting when the displacement amount of the blade became 100 μm or more was 20 times, and that it became worse in comparison with the result of Example.

FIG. 5 shows the result of the lifetime of the blade. As shown in FIG. 5, it was revealed that the number of cutting was lower and the lifetime of the blade was shorter than the result of Example.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. An ingot cutting method comprising:
   horizontally placing an ingot on a cutting table;
   providing a belt blade in a tensioned state between pulleys, the blade being a loop and essentially flat, and having a blade-abrasive-grain portion and a blade base;
   driving to rotate the blade by rotating the pulleys;
   cutting the ingot by relatively feeding the blade from above the ingot in a downward direction toward and below the ingot while spraying a coolant on the blade, wherein the ingot is cut with the blade driven to rotate in one direction; and
   cutting a next ingot after the cutting of the ingot, wherein before the cutting of the next ingot, a direction of driving to rotate the blade is changed into a direction opposite to the one direction to cut the ingot.

2. The ingot cutting method according to claim 1, wherein a displacement amount of the blade is measured during the cutting of the ingot, and timing of changing the direction of driving to rotate the blade is determined on the basis of the measured displacement amount.

3. The ingot cutting method according to claim 2, wherein a thickness of the blade base is 0.1 to 0.5 mm.

4. The ingot cutting method according to claim 1, wherein a thickness of the blade base is 0.1 to 0.5 mm.

5. A band saw cutting apparatus including:
   a cutting table on which an ingot is horizontally placed;
   a belt blade provided in a tensioned state between pulleys, the blade being a loop and essentially flat, and having a blade-abrasive-grain portion and a blade base; and
   a coolant spraying opening for spraying a coolant on the blade, the band saw cutting apparatus cutting the ingot by relatively feeding the blade from above the ingot in a downward direction toward and below the ingot, the blade being driven to rotate by rotating the pulleys, wherein
   the pulleys are each configured to be rotatable about an axis thereof in a first direction and a second direction opposite the first direction, and a direction of driving to rotate the blade can be changed to cut the ingot.

6. The band saw cutting apparatus according to claim 5, further comprising a displacement sensor for measuring a displacement amount of the blade, wherein the direction of driving to rotate the blade is changed on the basis of the displacement amount of the blade, the displacement amount being measured by the displacement sensor during cutting of the ingot.

7. The band saw cutting apparatus according to claim 6, wherein a thickness of the blade base is 0.1 to 0.5 mm.

8. The band saw cutting apparatus according to claim 5, wherein a thickness of the blade base is 0.1 to 0.5 mm.

* * * * *